(12) United States Patent
Erlandsen

(10) Patent No.: US 7,128,242 B2
(45) Date of Patent: Oct. 31, 2006

(54) STORAGE AND DISPENSING ALIQUOT PORTIONS OF LIQUID EGG IN A WHOLESOME AND CONVENIENT MANNER

(76) Inventor: David H. Erlandsen, 130 E. Montecito Ave., Sierra Madre, CA (US) 91023

( * ) Notice: Subject to any disclaimer, the term of this patent is extended or adjusted under 35 U.S.C. 154(b) by 241 days.

(21) Appl. No.: 10/663,517

(22) Filed: Sep. 15, 2003

(65) Prior Publication Data
US 2005/0056666 A1    Mar. 17, 2005

(51) Int. Cl.
*B65D 35/28* (2006.01)
*G01F 11/00* (2006.01)

(52) U.S. Cl. .................. 222/95; 222/146.6; 222/209; 222/333; 222/527

(58) Field of Classification Search .......... 222/95, 222/146.6, 209, 333, 383.3, 527, 529, 530
See application file for complete search history.

(56) References Cited

U.S. PATENT DOCUMENTS

| | | | | |
|---|---|---|---|---|
| 4,365,728 A | * | 12/1982 | Tokorozawa et al. | ........ 222/209 |
| 4,477,003 A | * | 10/1984 | Baker et al. | ................ 222/642 |
| 5,105,992 A | * | 4/1992 | Fender et al. | ................. 222/52 |
| 6,036,056 A | * | 3/2000 | Lee et al. | ..................... 222/63 |
| 6,171,082 B1 | * | 1/2001 | Hankner et al. | ....... 417/477.12 |
| 6,190,569 B1 | * | 2/2001 | Parker | ........................ 210/770 |

* cited by examiner

*Primary Examiner*—Joseph A. Kaufman

(74) *Attorney, Agent, or Firm*—Donald D. Mon

(57) ABSTRACT

A system top deliver liquid egg product in aliquot portions respective to a selected number of eggs, the system being totally contained in a cooled surround.

8 Claims, 2 Drawing Sheets

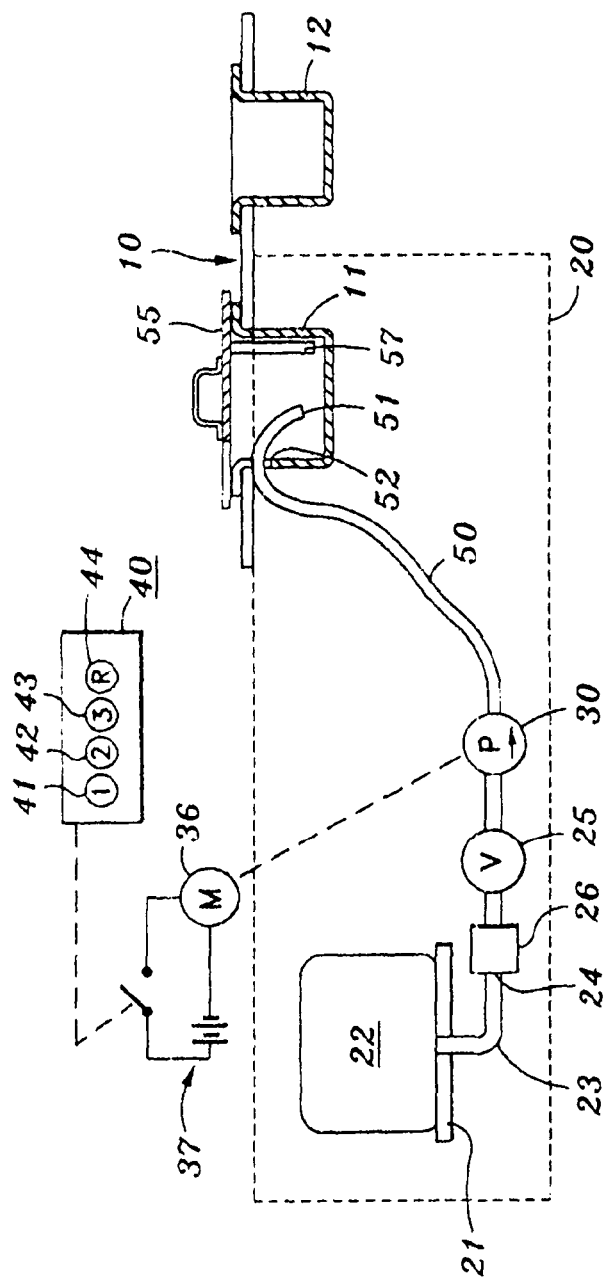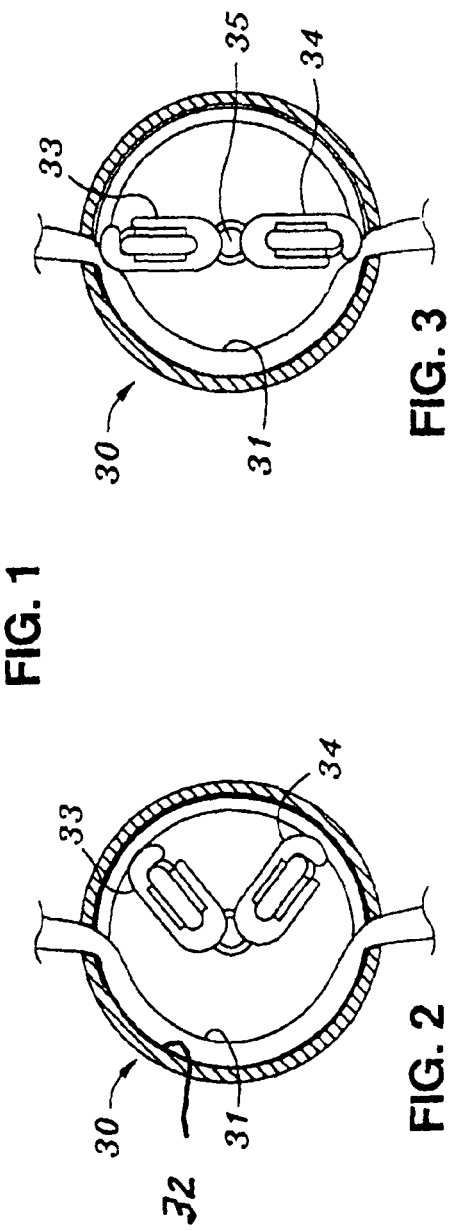

STORAGE AND DISPENSING ALIQUOT PORTIONS OF LIQUID EGG IN A WHOLESOME AND CONVENIENT MANNER

FIELD OF THE INVENTION

Storing liquid egg, and delivering it in aliquot portions to the cook, for example for one, two or three egg omelets, while maintaining the egg product in a wholesome and sanitary condition from the storage to the omelette pan.

BACKGROUND OF THE INVENTION

A restaurant customer who orders his eggs cooked in an unmixed fashion such as sunnyside up, or over, expects and receives a product in which the egg yolk and the white are discrete and recognizable from one another. For these dishes the cook breaks and cooks the eggs without disturbing them, except perhaps for puncturing the yolks.

Depending on the type of restaurant, an order of scrambled eggs or an omelette will also be produced by the cook from eggs which he breaks and then stirs or whips. Restaurants and cafes with relatively slow traffic in egg dishes do provide shell eggs to the cook, who breaks them when he prepares every order.

There is another type of restaurant, in which egg dishes are an active, even dominant part of the menu, and which rely heavily on omelettes as a specialty and product leader. In such operations, the cook must produce omelettes at a considerable rate, so there is no time for him to break eggs. For such operations deshelled whole eggs are provided in a liquid, mixed and stabilized form. This product is sometimes called "Egg Wash". It is the whole egg, mixed and stabilized, and supplied in a plastic bag. This bag is often confined in a cardboard box, and can conveniently be stored in a refrigerator located at the cook's omelette stand.

The advantages of this form of egg are evident. It arrives at the cook's stand free from the biological hazards of handling a whole unshelled egg. It can readily be portioned to suit an order for any number of eggs per order. Even more importantly, it is the same product as would have been produced from an egg that was shelled at the stand. The customer will not know the difference.

However advantageous the above is, and it is in widespread use, restaurant proprietors and public health inspectors are on nearly continuous alert because of the way the egg product is actually dispensed. In practice there is a cold-table insert for the egg product. The cook fills the insert from the bag and returns the bag to the refrigerator. Then he puts a ladle, usually one which conforms to a "one-egg" size, into the filled insert. When he makes the omelette, he doles out an amount respective to a number of eggs, one at a time, puts it in the pan, and returns the ladle to the insert when where it is kept until the next order.

Notice that the egg product in the insert will be exposed to the air for an undetermined length of time depending on activity, exposed to ambient temperature, subjected to repeated return of a ladle into the egg product, and subject to things passing into it, which they do. The temperature and sanitary condition of the egg product are of continuing and considerable importance. After the egg product has left the bag, its condition is no longer certain. Also, it becomes exposed to the question about sanitary condition of the insert.

These uncertainties plague the operators of restaurants with heavy egg traffic, and often result in negative grades from inspectors.

It is an object of this invention to provide liquid egg product in a strictly-sanitary condition up to the moment it is placed in the pan.

It is another object of this invention to provide a delivery system which can produce on demand egg product in desired aliquot quantities.

It is yet another object of this invention to produce a system that can readily be primed and sanitized, utilizing the same equipment as is used to deliver egg product to the pan.

BRIEF DESCRIPTIONS OF THE INVENTION

An egg product delivery system according to this invention is adapted for use with a packaged and refrigerated supply of liquid egg product. It is sometimes referred to herein as a "bag". A tubing sometimes called an umbilical cord, is connected to the bag to remove liquid egg from the bag.

A peristaltic pump withdraws the product from the bag, delivering a known volume of the product per pulse, part of revolution, or multiple revolutions. A control for this pump causes the desired action, and thereby the extraction from the bag and movement of the desired amount of egg product to the pan.

A delivery hose from the pump extends into an insert customarily used instead to hold egg product to be ladled out, where the hose outlet end is available for the cook to direct the output to a pan.

According to a preferred but optional feature of this invention, the outlet end of the hose is attached to a lid which removably covers the insert so as to protect the insert from dropped items, and to keep the hose end in a cooled region.

According to still another preferred but optional feature of this invention, a leg or legs is fixed to the bottom of the lid so that the lid can be laid aside, but with the hose end held away from surrounding surfaces. Also, the legs can be arranged so that a pan can be slid under the lid to receive the liquid egg. Then the cook need not handle the lid at all.

According to yet another preferred but optional feature of the invention a control for the pump is also provided with a "run" setting, by means of which a sanitizing solution can be sent through the system downstream from the umbilical cord to clean the system, or a continuous longer flow of egg product.

The above and other features of this invention will be fully understood from the following detailed description and the accompanying drawings, in which:

BRIEF DESCRIPTION OF THE DRAWINGS

FIG. 1 is a side view partly in schematic and partly in cross-section view;

FIG. 2 is a schematic showing of a peristaltic pump in its open condition;

FIG. 3 is a view of the pump of FIG. 2 in its operating condition;

DETAILED DESCRIPTION OF THE INVENTION

Figure 5:
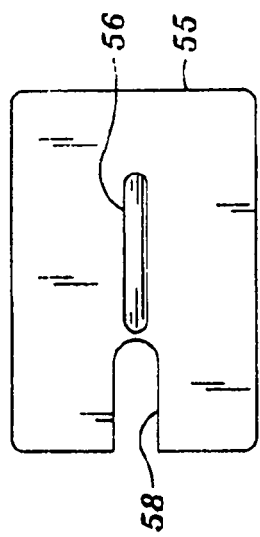
FIG. 5 is a top view of FIG. 4 with this invention.
Figure 7:
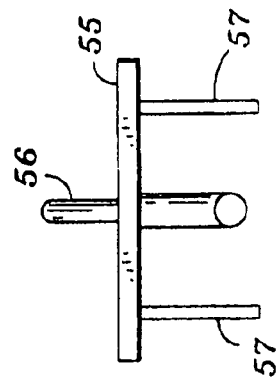
FIG. 7 is a right hand end view of the lid in FIG. 4.

While this system need not be contained principally in a refrigerator or refrigerated work counter, it is an important advantage that it can be. Accordingly a work counter 10 is shown with a plurality of metal inserts 11,12, whose sides and bottoms are refrigerated, usually by cold air, but occasionally with chilled water. These will usually contain various ingredients of omelettes. One of them, insert 11, is associated with the liquid egg product.

The refrigerated enclosure shown schematically by line 20 has a support 21 to hold a plastic bag 22 filled with liquid egg. A tubing 23 sometimes called an umbilical cord leads from the bag to a free end 24. It is usually a separate tubing attached to the bag. The free end of tubing 23 is closed until it is connected into the system by a coupler 26. An optional off-on shut-off valve 25 may be provided to which tubing 23 can be connected.

The term "peristaltic pump" is used herein to define a pump which delivers liquid product in aliquot portions respective to a pulsed action. A pulsed action means that there is no contact of the product in the pump structure except for contact with the tubing in which it is conveyed. For example it does not include piston-cylinder types in which a piston directly contacts the product.

This invention utilizes the advantageous roller-type peristaltic pump. Other types exist which can be used that utilize isolated valving techniques, but the roller type offers significant advantages in the environment where these pumps will be used, not the least of which is their capacity for convenient and quick sanitizing.

A peristaltic pump 30 is connected to this outlet of the shut-off valve or to the tubing from the bag. Its principal characteristic is that the egg product does not come into contact with any of the mechanism of the pump itself. Instead, as shown in FIGS. 2 and 3, the pump includes a length of springly flexible pump tubing 31 that tends to be self-shaped retaining, but which can be pinched closed. When a pinching force is removed, the tubing will reopen to its full extent.

An arcuate race 32 backs up the tubing. A pair of rollers 33,34 are rotatably mounted at a center 35 for rotation parallel to the race. For convenience these are called rollers, although they could instead merely slide along the tubing. When in contact with the tubing they pinch it closed. As they move along the tubing they displace the egg product ahead of the pinch. The volume delivered is thereby determined by the passage of the rollers. In the illustration, the rollers are spaced apart by 180 degrees, so that there is no free flow through the pump at any time. Flow only occurs as the consequence of moving the rollers along the tubing.

FIG. 2 shows the rollers in an open position moved out of contact with the tubing. The tubing can then be removed and replaced, or if desired, cleaned out by a pressurized flow of sanitizing fluid forced through it. Also, when the system is set up and empty, it can be primed.

The rollers are rotated around center 35 by a motor 36. The motor is powered by a source 37 enabled by control 40. This control is provided with several switches 41, 42, 43 and 44. As examples, switches 41, 42, and 43 are respective to running times for delivery of one, two or three eggs.

Switch 44 can run the system independently of time. The cook can then draw as much egg product as he desires, or can run sanitizing solution through the system, or can run egg product to prime the system when the system is empty.

Control 40 includes timers respective to the running times needed for the respective deliveries. Alternatively, the pump can be proportioned to deliver one egg per revolution.

Delivery hose 50 receives product from the pump and delivers it to its delivery end 51. If desired, a nozzle or a spout can be provided there. The hose passes through a notch 52 or hole in the insert so that it is always in a cooled region.

The delivery hose downstream from the pump will always be filled with egg product, but because the hose is chilled, the product is safe. Further, it is shielded from the air—it is not exposed until after it leaves the hose, as it would be if it merely were poured into the insert.

The end of the delivery hose can also be provided with a handle, but it is potentially advantageous both to cover the hose end and the insert to keep them clean and cold. For this purpose a removable lid 55 can be laid on the top of the insert, with the hose end attached to its underside. Then a handle 56 can be attached to the top of the lid for convenient manipulation.

Figure 4:
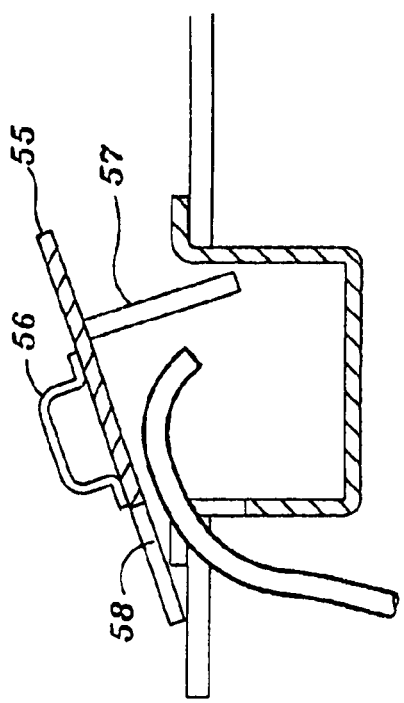
FIG. 4 is a fragmentary side view of a lid.
Figure 6:
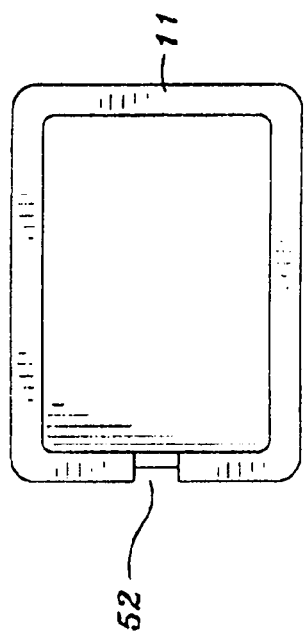
FIG. 6 is a top view of an insert for use with this invention.

So that lid and hose can be set down without contaminating the hose, a leg 57 or legs project from the bottom of the lid. These can enter the insert when the lid is on, but as shown in FIG. 4, they will hold the hose end up above the work surface when the lid is moved over the work surface. A notch 58 in the lid will pass the hose in the position of FIG. 4. As a further advantage, the leg or legs can be long enough to support the lid with the delivery end high enough above the work table that a pan can be shoved underneath them. Then the cook need not hold the lid or the pan while egg is discharged into the pan.

The delivery hose will be provided with sufficient length that it can be pulled out as desired, and returned to the enclosure.

This invention thereby provides a sanitary, reliable and convenient system to deliver egg product directly to the cooking pan in a desired amount.

This invention is not to be limited by the embodiments shown in the drawings and described in the description, which are given by way of example and not of limitation, but only in accordance with the scope of the appended claims.

I claim:

1. A system for storing and dispensing liquid egg product in aliquot portions, said system receiving egg product which is initially stored in a flexible bag, said system comprising:

a peristaltic pump adapted to receive egg product from the bag and to produce an aliquot portion of egg product per actuation and a motor driving said pump;

a control adapted to actuate said motor for a length of time respective to an aliquot portion;

a delivery hose having an inlet end connected to the pump, and a delivery end available to a user, said delivery end being open and un-valved;

said pump comprising a race, a pump tubing along said race, and a pair of rollers rotatable around the center of the race and angularly spaced apart from one another, said rollers and said race being radially spaced from one another by a spacing such that the rollers will pinch the pump tubing closed when in radial contact with it;

there being no impediment to flow of the egg product between the pump and the outlet of the delivery end.

2. A system according to claim 1 in which said system is entirely contained in a cooled environment.

3. A system according to claim 2 in which a worktable insert receives the delivery end of the delivery hose, said insert having an open top.

4. A system for storing and dispensing liquid egg product in aliquot portions, said system which is initially stored in a flexible bag, said system comprising;

a peristaltic pump adapted to receive egg product from the bag and to produce an aliquot portion of egg product per actuation, and a motor driving said pump;

a control adapted to actuate said motor for a length of time respective to an aliquot portion;

a delivery hose having an inlet end connected to said pump, and a delivery end available to a user;

said pump comprising a race, a pump tubing along said race, and a pair of rollers rotatable around the center of the race and angularly spaced apart from one another, said rollers and said race being radially spaced from one another by a spacing such that the rollers will pinch the pump tubing closed when in radial contact with it;

a worktable insert receiving the delivery end of the delivery hose, said insert having an open top; and a lid to close said open top of said insert, the delivery end of the delivery hose being attached to the underside of said lid.

5. A system according to claim 4 in which a handle is attached to the upper side of said lid, and in which a leg is fixed to the underside of said lid adjacent to the outlet end of the delivery hose to prevent contact of the delivery end with a work surface.

6. A system according to claim 5 in which said leg spaces the outlet end above the work surface so that a pan can be placed under the lid to receive egg without manipulating the lid.

7. A system according to claim 4 in which said control is adapted to run the pump continuously to sanitize or to prime the pump and delivery hose.

8. A system according to claim 4 in which said system is entirely contained in a cooled environment.

* * * * *